W. Looker.
Cultivator Plow.

No. 87,690. Patented Mar. 9, 1869.

Witnesses:
H. Benneckendorf.
Wm. A. Morgan.

Inventor.
W. Looker.
per Munn & Co.
Attorneys.

UNITED STATES PATENT OFFICE.

WILLIAM LOOKER, OF GRAHAM, MISSOURI.

IMPROVEMENT IN CULTIVATOR-PLOWS.

Specification forming part of Letters Patent No. 87,690, dated March 9, 1869.

*To all whom it may concern:*

Be it known that I, WILLIAM LOOKER, of Graham, in the county of Nodaway and State of Missouri, have invented a new and Improved Cultivator-Plow; and I do hereby declare that the following is a full, clear, and exact description thereof, which will enable others skilled in the art to make and use the same, reference being had to the accompanying drawings, forming part of this specification.

Figure 1:
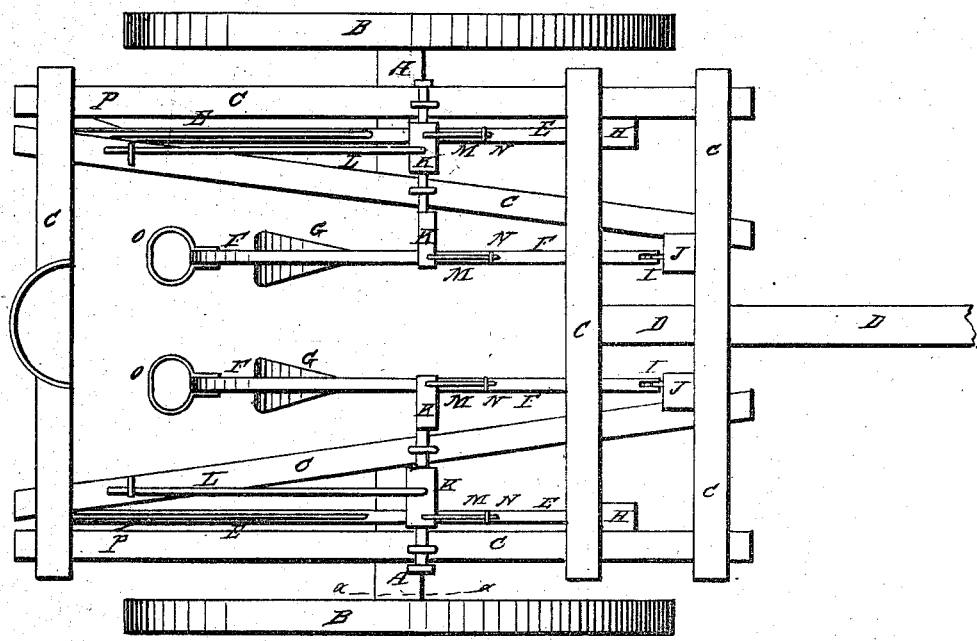
Figure 2:
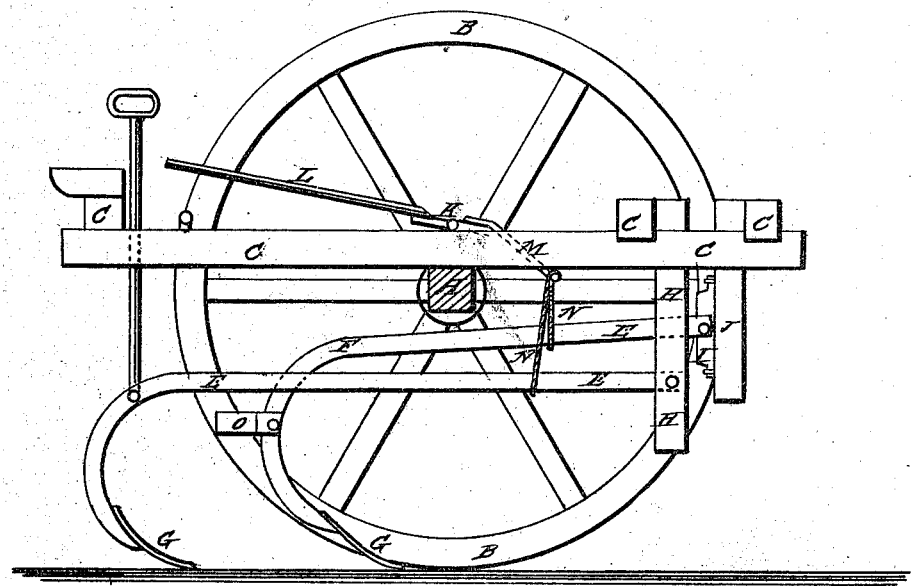

Figure 1 is a top or plan view of my improved machine. Fig. 2 is a side view of the same, partly in section, through the line $x\ x$, Fig. 1.

Similar letters of reference indicate corresponding parts.

My invention has for its object to furnish an improved cultivator-plow, simple in construction, effective in operation, and easily operated, each of the plows operating independently of the others; and it consists in the construction and combination of the various parts of the machine, as hereinafter more fully described.

A is the axle-tree, to which the wheels B are attached, and the middle part of which is cut away so as to give the operator a free and unobstructed view of the corn while being cultivated. The wheels B may be ordinary wagon-wheels, or they may be wheels made expressly for the machine, as may be desired or convenient.

C is the frame of the cultivator, which is securely attached to the axles A, and to which the tongue D is securely attached. The frame C is so formed, as shown in Fig. 1, as to leave its middle part open, so as to afford an unobstructed view of the corn being cultivated.

E are the outer and F are the inner plow-beams, the rear parts of which are curved downward, and have the plows G attached to their lower or rear ends. The forward ends of the outer beams, E, enter and are pivoted in slots formed in the lower ends of the downwardly-projecting arms H, so that the rear parts of said beams may have a free vertical movement. The forward ends of the inner beams, F, are pivoted to the vertical bars or shafts I, the journals of which work in bearings attached to the downwardly-projecting arms J, so that the rear parts of the inner beams, F, may have a free vertical and lateral movement.

The upper ends of the downwardly-projecting arms H and J are securely and strongly attached to the frame C, so that they may easily sustain the draft-strain of the plows.

K are short horizontal shafts, the journals of which work in bearings attached to the frame C, and to which are strongly and rigidly attached the forward ends of the levers L, the rear or free ends of which extend back into such a position that they may be conveniently reached and operated by the driver from his seat.

To each of the shafts K are also securely and rigidly attached short arms or levers M, projecting forward and downward, and the free or forward ends of which are connected to the plow-beams E and F by the chains N, as shown in Figs. 1 and 2. By adjusting the length of the chains N the plows may be adjusted to run at a greater or less depth in the ground, and by means of the levers L the plows may be raised and lowered away from the ground while passing from place to place.

O are stirrups or loops attached to the rear parts of the inner beams, F, so that the said inner beams may be raised to pass over obstructions and guided to pass around obstructions or avoid irregular hills by the operator with his feet.

To the rear parts of the outer beams, E, are pivoted the lower ends of the rods P, the upper ends of which have handles formed upon them, and extend up into such a position that they may be easily reached and operated by the driver from his seat to raise the said beams E to pass over obstructions.

Having thus described my invention, I claim as new and desire to secure by Letters Patent—

The combination of the axles A, frame C, arms H J, vertical shafts I, plow-beams F and E, chains N, arms or levers M, short shafts K, and levers L with each other, as herein shown and described, and for the purpose set forth.

The above specification of my invention signed by me this 7th day of September, 1868.

WILLIAM LOOKER.

Witnesses:
MARTIN PALMER,
H. D. COBERLY.